United States Patent
Park et al.

(10) Patent No.: US 11,031,619 B2
(45) Date of Patent: Jun. 8, 2021

(54) CELL FOR FLOW BATTERY

(71) Applicant: The Curators of the University of Missouri, Columbia, MO (US)

(72) Inventors: Jonghyun Park, Rolla, MO (US); Mohammed Abdulkhabeer Al-Yasiri, Wasit (IQ)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 300 days.

(21) Appl. No.: 15/954,728

(22) Filed: Apr. 17, 2018

(65) Prior Publication Data

US 2018/0342752 A1    Nov. 29, 2018

Related U.S. Application Data

(60) Provisional application No. 62/511,145, filed on May 25, 2017.

(51) Int. Cl.

| H01M 8/18 | (2006.01) |
|---|---|
| H01M 8/0273 | (2016.01) |
| H01M 8/0258 | (2016.01) |
| H01M 8/0263 | (2016.01) |
| H01M 8/2455 | (2016.01) |
| H01M 8/04186 | (2016.01) |
| B60L 50/71 | (2019.01) |
| H01M 8/00 | (2016.01) |
| B60L 53/80 | (2019.01) |
| B60L 50/64 | (2019.01) |
| H01M 8/2475 | (2016.01) |

(52) U.S. Cl.
CPC ............. *H01M 8/188* (2013.01); *B60L 50/64* (2019.02); *B60L 50/71* (2019.02); *B60L 53/80* (2019.02); *H01M 8/004* (2013.01); *H01M 8/0258* (2013.01); *H01M 8/0263* (2013.01); *H01M 8/0273* (2013.01); *H01M 8/04186* (2013.01); *H01M 8/2455* (2013.01); *H01M 8/2475* (2013.01); *H01M 2250/20* (2013.01)

(58) Field of Classification Search
None
See application file for complete search history.

(56) References Cited

U.S. PATENT DOCUMENTS

| 5,665,212 A | 9/1997 | Zhong et al. |
| 8,343,646 B1 | 1/2013 | Wilkins et al. |

(Continued)

OTHER PUBLICATIONS

U.S. Department of Energy, EV Everywhere, Grand Challenge Blueprint, Jan. 31, 2013, 16 pages, http://energy.gov/sites/prod/files/2016/05/f31/eveverywhere_blueprint.pdf.

(Continued)

*Primary Examiner* — Yoshitoshi Takeuchi
(74) *Attorney, Agent, or Firm* — Stinson LLP

(57) ABSTRACT

A reaction cell for a flow battery having flow channels positioned within a recess of a non-porous and non-brittle housing that is also a dielectric. Positioning the flow channels within the recess eliminates the need for end plates, gaskets, and insulators of conventional designs. A current collector and an electrode within the recess have areas approximately equal to the area of the recess such that they fit within the recess and maximize the contact area between them.

15 Claims, 5 Drawing Sheets

(56) References Cited

U.S. PATENT DOCUMENTS

2016/0006046 A1* 1/2016 Bucsich ............... H01M 8/188
　　　　　　　　　　　　　　　　　　　　　　429/463
2017/0324108 A1* 11/2017 Yamaguchi ......... H01M 8/0271

OTHER PUBLICATIONS

U.S. Department of Energy, EV Everywhere Grand Challenge Road to Success, Jan. 2014, 16 pages, http://energy.gov/sites/prod/files/2014/02/f8/eveverywhere_road_to_success.pdf.

Journal of Power Sources, Martha Schreiber et al., Practical and commercial issues in the design and manufacture of vanadium flow batteries, journal homepage: www.elsevier.com/locate/jpowsour, Journal of Power Sources 206 (2012) 483-489.

Composite Structures, K.H. Kim et al., Development of carbon composite bipolar plate (BP) for vanadium redox flow batter (VRFB), journal homepage: www.elsevier.com/locate/compstruct, Composite Structures 109 (2014) 253-259.

Advanced Functional Materials, Wei Wang et al., Recent Progress in Redox Flow Battery Research and Development, www.afm-journal.de, © 2012 WILEY-VCH Verlag GmbH & Co. KGaA, Weinheim, wileyonlinelibrary.com, pp. 1-17.

Journal of Power Sources, Peng Qian et al., A novel electrode-bipolar plate assembly for vanadium redox flow battery applications, journal homepage: www.elsevier.com/locate/jpowsour, Journal of Power Sources 175 (2008) 613-620.

Composite Structures, Soohyun Nam et al., Nano carbon/fluoroelastomer composite bipolar plate for a vanadium redox flow battery (VRFB), journal homepage: www.elsevier.com/locate/compstruct, Composite Structures 159 (2017) 220-227.

Composite Structures, Jun Woo Lim et al., "Accepted Manuscript" Carbon fiber/polyethylene bipolar plate-carbon felt electrode assembly for vanadium redox flow batteries (VRFB), Composite Structures (2015), doi: http://dx.doi.org/10.1016/http://dx.doi.org/http://dx.doi.org/10.1016/j.compstruct.2015.08.057, 35 pages.

Journal of Materials Chemistry A, Minjoon Park et al., Material selection and optimization for highly stable composite bipolar plates in a vanadium redox flow batteries, J. Mater. Chem. A, 2014, 2, 15808-15815 © The Royal Society of Chemistry 2014.

RSC Advances, Puiki Leung et al., Progress in redox flow batteries, remaining challenges and their applications in energy storage, RSC Advances, 2012, 2, 10125-10156.

J Appl Electrochem, Doug Aaron et al., Polarization curve analysis of all-vanadium redox flow batteries, J Appl Electrochem (2011) 41:1175-1182.

\* cited by examiner

CELL FOR FLOW BATTERY

CROSS-REFERENCE TO RELATED APPLICATION

This application claims priority from U.S. Provisional Patent Application No. 62/511,145, filed May 25, 2017, entitled "CELL FOR FLOW BATTERY." The entire contents of the above-identified application are expressly incorporated herein by reference, including the contents and teachings of any references contained therein.

FIELD

Aspects of the present invention generally relate to the field of flow batteries for transport systems, such as electric vehicles, robots, and the like. More particularly, aspects of the present invention relate to flow batteries having flow channels positioned within a recess of a non-porous and non-brittle housing.

BACKGROUND

Conventional transport systems utilize lithium-ion batteries for energy storage. Disadvantages of lithium-ion batteries include lengthy recharge times, bulkiness, and relatively short life due to mechanical and/or chemical degradation. Moreover, lithium-ion batteries require increasingly large physical sizes (e.g., volume) for adequate power generation for vehicles or the like because energy and power depend on each other.

Although conventional flow batteries provide advantages compared to lithium-ion batteries, including long cycle life, separation of energy and power ratings, and availability of deep discharge, they are still too bulky and provide insufficient power for use in transport systems. Conventional flow batteries include a cathode, an anode, a membrane separator, current collectors, gaskets, insulators, and reaction cells within a confined volume, such as channels within a bipolar plate. All of these components must be carefully compressed between two end plates.

The bipolar plate, also called a flow-field plate, distributes electrolyte solution inside flow battery cells, isolates different cells in multi-cell battery cores, conveys current into and out of cells, and dissipates the stack heat. The main role of the bipolar plate is to deliver reactants to and from the porous anode and cathode materials via flow field channels. Typical bipolar plates comprise metals, nonmetals (e.g., graphite), or composite materials (e.g., polymers). Disadvantageously, metal bipolar plates require a corrosion-protective coating to improve lifespan and nonmetal bipolar plates are porous and brittle. Composite bipolar plates can be problematic because they must meet the requirements of operating with acidic concentrated vanadium. Despite efforts to create new composite materials that can improve the bulk conductivity and properties of bipolar plates, new approaches have been complex and costly at least in part because they require additional operating equipment for specific environmental conditions (e.g., temperature, pressure, and species ratios). In addition to these disadvantages, utilizing bulky conventional flow batteries in a transport system would result in inefficient space utilization, as well as unequal weight distribution. In other words, conventional flow batteries may be well-suited for stationary applications but are too heavy and bulky for utilization in transitory environments, such as electric vehicles and the like.

SUMMARY

Aspects of the invention relate to a cell structure for a vanadium redox flow battery (VRFB) that includes flow channels positioned within a recess of a non-porous and non-brittle housing. Positioning the flow channels within the recess eliminates the need for end plates, gaskets, and insulators, which beneficially improves safety, extends lifespan, utilizes fewer components, and improves ease of assembly compared to conventional VRFB cells.

An electrochemical reaction cell in accordance with an aspect of the disclosure includes a housing, an electrode, and a current collector. The housing has an inner surface and a recess formed in the inner surface. The housing is configured to be assembled with a corresponding housing of another electrochemical reaction cell. Moreover, the housing has an inlet and an outlet extending from the recessed inner surface to an outer surface of the housing. The inlet is configured to permit an electrolyte fluid to flow into the recess and the outlet is configured to permit the electrolyte fluid to flow out of the recess. The electrode is positioned within the recess and the current collector is positioned within the recess between the electrode and the recessed inner surface of the housing. The current collector has a flow channel formed in it that is configured to convey the electrolyte fluid such that the electrolyte fluid is in contact with the electrode. The housing is substantially rigid such that the housing provides an assemble force when the housing is assembled with the corresponding housing of the other electrochemical reaction cell.

An energy storage system in accordance with another aspect of the disclosure includes a first tank, a second tank, a reaction cell, a first pump, and a second pump. The first tank is configured for storing an anolyte and the second tank is configured for storing a catholyte. The reaction cell includes a first housing portion, a first current collector, an anode electrode, a second housing portion, a second current collector, a cathode electrode, and a membrane. The first housing portion has an inner surface and a first recess formed in the inner surface. The first current collector is positioned within the first recess adjacent to the recessed inner surface of the first housing portion. The first current collector has an anolyte flow channel formed in it that is in fluid communication with the first tank. The anolyte flow channel is configured to convey the anolyte. The anode electrode is also positioned within the first recess adjacent to the first current collector. The second housing portion has an inner surface and a second recess formed in the inner surface. The second current collector is positioned within the second recess adjacent to the recessed inner surface of the second housing portion. The second current collector has a catholyte flow channel formed in it that is in fluid communication with the second tank. The catholyte flow channel is configured to convey the catholyte. The cathode electrode is also positioned within the second recess adjacent to the second current collector. The membrane is positioned adjacent to the non-recessed portions of the inner surfaces of the first and second housing portions such that it is configured to form an interface between the anode electrode and the cathode electrode. The first pump is configured for pumping the anolyte from the first tank through the anolyte flow channel via a first input supply tube and the second pump is configured for pumping the catholyte from the second tank through the catholyte flow channel via a second input supply tube. The first and second housing portions are assembled together at the non-recessed inner surfaces with the membrane between them such that the anolyte is confined within the first recess and the catholyte is confined within the second recess.

A transport system in accordance with an aspect of the disclosure includes a first tank, a second tank, a reaction cell, a first pump, and a second pump. The first tank is configured for storing an anolyte and the second tank is configured for storing a catholyte. The reaction cell includes a first housing portion, an anode current collector, an anode electrode, a second housing portion, a cathode current collector, a cathode electrode, and a membrane. The first housing portion has an inner surface and a first recess formed in the inner surface. The anode electrode is positioned within the first recess and the anode current collector is positioned within the first recess between the anode electrode and the first recessed inner surface of the first housing portion. The anode current collector has an anolyte flow channel formed in it that is in fluid communication with the first tank. The anolyte flow channel is configured to convey the anolyte. The second housing portion has an inner surface and a second recess formed in the inner surface. The cathode electrode is positioned within the second recess and the cathode current collector is positioned within the second recess between the cathode electrode and the second recessed inner surface of the second housing portion. The cathode current collector has a catholyte flow channel formed in it that is in fluid communication with the second tank. The catholyte flow channel is configured to convey the catholyte. The membrane is configured to form an interface between the anode electrode and the cathode electrode. The first pump is configured for pumping the anolyte from the first tank through the anolyte flow channel via a first input supply tube that couples the first tank and the reaction cell. Similarly, the second pump is configured for pumping the catholyte from the second tank through the catholyte flow channel via a second input supply tube. The first and second housing portions are assembled together with the membrane between them such that the anolyte is confined within the first recess and the catholyte is confined within the second recess. The reaction cell is tubular and distributed throughout the transport system in a serpentine configuration within an area defined by the width and length of the transport system.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1A:
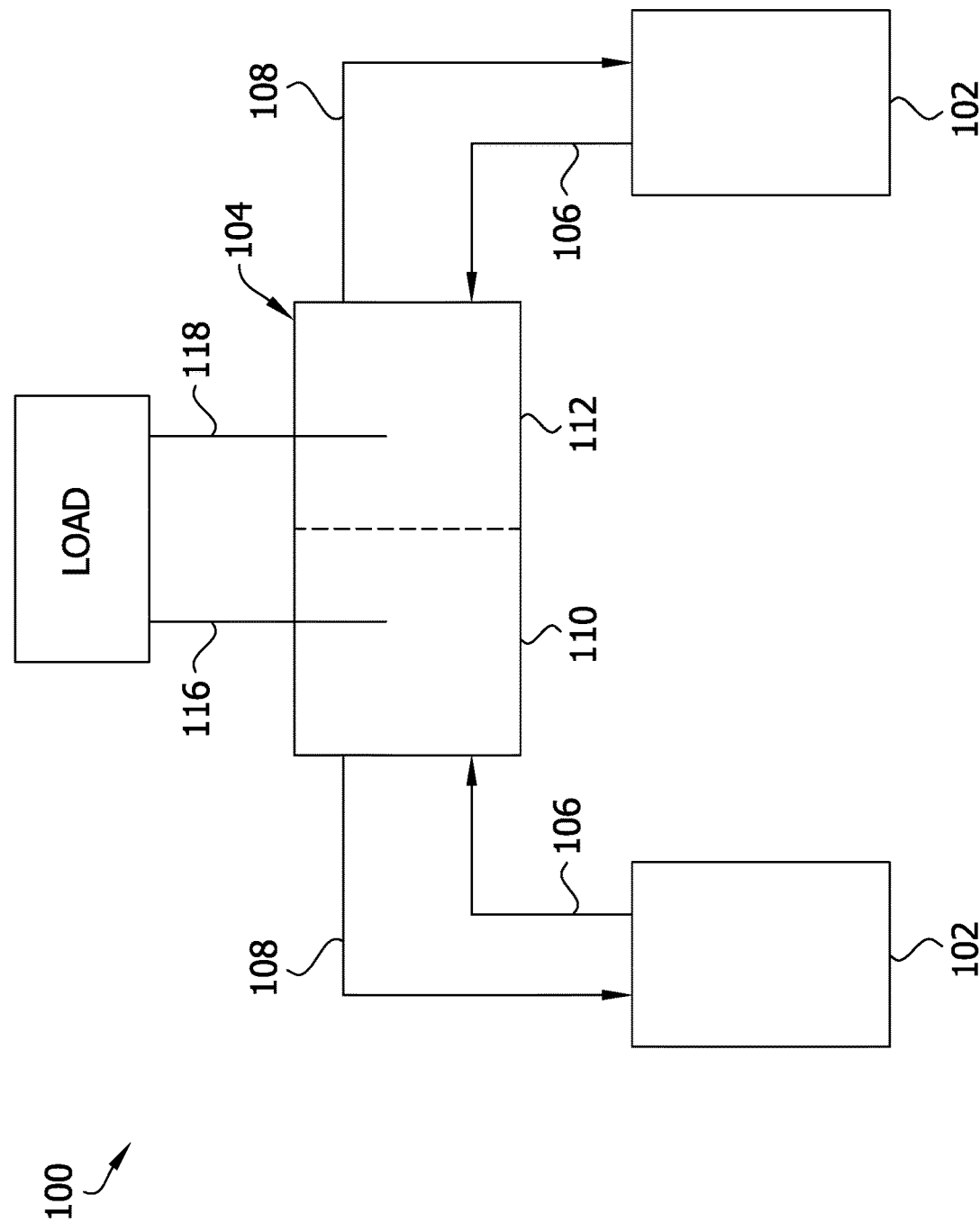
FIG. 1A is a block diagram illustrating an exemplary energy storage system within which aspects of the invention may be incorporated.
Figure 1B:
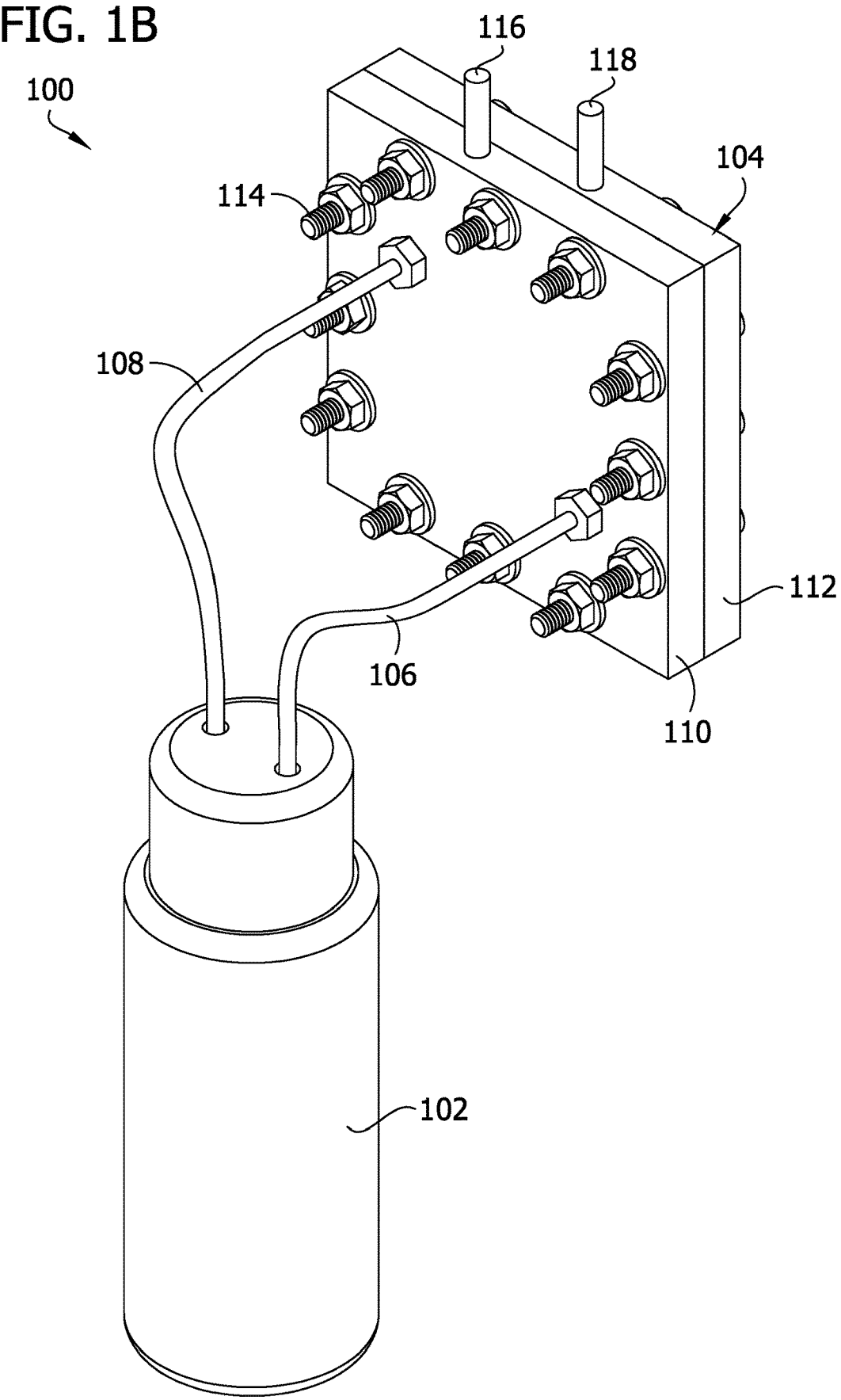
FIG. 1B is a perspective view of an exemplary energy storage system within which aspects of the invention may be incorporated.

FIGS. 1A and 1B illustrates an exemplary energy storage system 100 in accordance with an aspect of the disclosure.

The energy storage system 100 includes a tank 102, a reaction flow cell 104, an input supply tube 106, and an output supply tube 108. The reaction flow cell 104 includes a first housing 110 and a second housing 112 assembled together via a plurality of mechanical fasteners 114. A first conductor 116 extends through the first housing 110 and a second conductor 118 extends through the second housing 112. In an embodiment, the energy storage system 100 comprises a vanadium redox flow battery (VRFB). Although embodiments described herein may be considered lab scale, one of ordinary skill in the art will understand that the teachings herein apply to energy storage systems of smaller and larger scale (e.g., grid scale, transport system scale, etc.).

The input supply tube 106 and the output supply tube 108 couple the tank 102 to the reaction flow cell 104. In an embodiment, the energy storage system 100 includes one or more pumps and input supply tube 106 couples the tank 102 to the pump and the pump to reaction flow cell 104. The tank 102, reaction flow cell 104, input supply tube 106, output supply tube 108, and/or any pumps are mechanically coupled to portions of an environment (e.g., transport system) within which the energy storage system 100 is installed. For example, mechanical fasteners (e.g., brackets, braces, etc.) may couple the components of energy storage system 100 to structural elements (e.g., undercarriage, frame, etc.) of a transport system.

The tank 102 of FIGS. 1A and 1B is configured for storing electrolyte fluids. In an embodiment, a first tank 102 is configured for storing an anolyte and a second tank 102 is configured for storing a catholyte. For simplicity, only a single tank 102 is shown in FIG. 1B. Each tank 102 may be comprised of a metal and/or polymer compatible with the stored electrolytes. An exemplary material from which tank 102 may be manufactured includes polyvinyl chloride (PVC), polytetrafluoroethylene (PTFE), high-density polyethylene (HDPE), low-density polyethylene (LDPE), and the like. The size (e.g., volume capacity) and shape of tank 102 may be altered depending upon the environment in which it will be installed (e.g., transport system, etc.). The size of tank 102 can also be modified to satisfy energy storage requirements of the specific application. In other words, the energy capacity and power capacity of energy storage system 100 are independent of each other. In an embodiment, tank 102 includes an opening configured to allow emptying and re-filling of the tank with electrolytes. For instance, the opening may allow the tank 102 to undergo a refueling operation similar to adding gasoline to a conventional internal combustion vehicle. An exemplary anolyte for use with energy storage system 100 includes vanadium electrolyte solution (V+2, V+3) and an exemplary catholyte includes vanadium electrolyte solution (V+5, V+4).

The reaction flow cell 104 is configured to provide an environment through which electrolyte fluids flow, resulting in ion exchange that provides a flow of electric current. The reaction flow cell 104 may be comprised of various cross-sectional configurations, as further described herein. Although the cross-sections of reaction flow cell 104 described herein are substantially square, one having ordinary skill in the art will understand that reaction flow cell 104 may have different cross-sectional shapes, such as substantially rectangular, circular, elliptical, triangular, hexagonal, octagonal, U-shaped, and the like. The reaction flow cell 104 is distributed throughout the environment (e.g., a transport system) in which it is installed. For example, reaction flow cell 104 may have a substantially plate-like shape having an area defined by a length and width of the environment in which it is installed. In another example, reaction flow cell 104 may be rolled into a substantially tubular shape and distributed in a serpentine configuration in an area defined by the length and width of the environment in which it is installed. Aspects of distributing a reaction flow cell throughout a transport system are further described herein and in U.S. patent application Ser. No. 15/210,405, filed Jul. 14, 2016, entitled DISTRIBUTED ENERGY STORAGE SYSTEM, the entire disclosure of which is expressly incorporated herein by reference, including the contents and teachings of any references contained therein.

The input supply tube 106 is configured for fluidly communicating electrolyte fluids from tank 102 to reaction flow cell 104 and the output supply tube 108 is configured for fluidly communicating electrolyte fluids from reaction flow cell 104 to tank 102. The input supply tube 106 and output supply tube 108 may be comprised of any polymer compatible with the electrolytes, such as PVC, PTFE, HDPE, LDPE, and the like.

The first housing 110 and the second housing 112 are configured to contain and protect the components of reaction flow cell 104, as further described herein. The first housing 110 and second housing 112 may be manufactured from any rigid material compatible with the electrolytes. For example, the rigidity of first housing 110 and second housing 112 obviates the need for end plates and the compatibility with the electrolytes obviates the need for insulators. In an embodiment, first housing 110 and second housing 112 are manufactured from a thermoplastic, such as PVC. Exemplary advantages of PVC include light weight, good mechanical strength, impermeability, and resistance to weathering, chemical rotting, and corrosion. Furthermore, PVC can be cut, shaped, and joined in a variety of configurations. Aspects of first housing 110 and second housing 112 are further described herein.

The mechanical fasteners 114 are configured to mechanically join first housing 110 and second housing 112 into a single housing assembly. Although embodiments described herein utilize bolt fasteners, one of ordinary skill in the art will understand that other mechanical fasteners are within the scope of the present disclosure. Exemplary mechanical fasteners include, but are not limited to, clamps, clips, pins, rivets, screws, staples, and the like. Moreover, one of ordinary skill in the art will understand that first housing 110 and second housing 112 may be mechanically joined by alternative means. Exemplary means for joining first housing 110 and second housing 112 include, but are not limited to, crimping, welding, soldering, brazing, taping, gluing (or other adhesives), cementing, and the like. Additionally or alternatively, first housing 110 and second housing 112 may be joined with by magnetic force, vacuum force (e.g., suction cups, etc.), friction force, and the like.

The conductors 116 and 118 are configured to carry electrical current from reaction flow cell 104 to electrical contacts connected to an electrical load (e.g., of a transport system, etc.). In an embodiment, conductors 116 and 118 are comprised of graphite and act as current collectors. The conductor 116 may comprise one or more wires extending through housing 110 and conductor 118 may comprise one or more wires extending through housing 112. Aspects of conductors 116 and 118 are further described herein.

Figure 2:
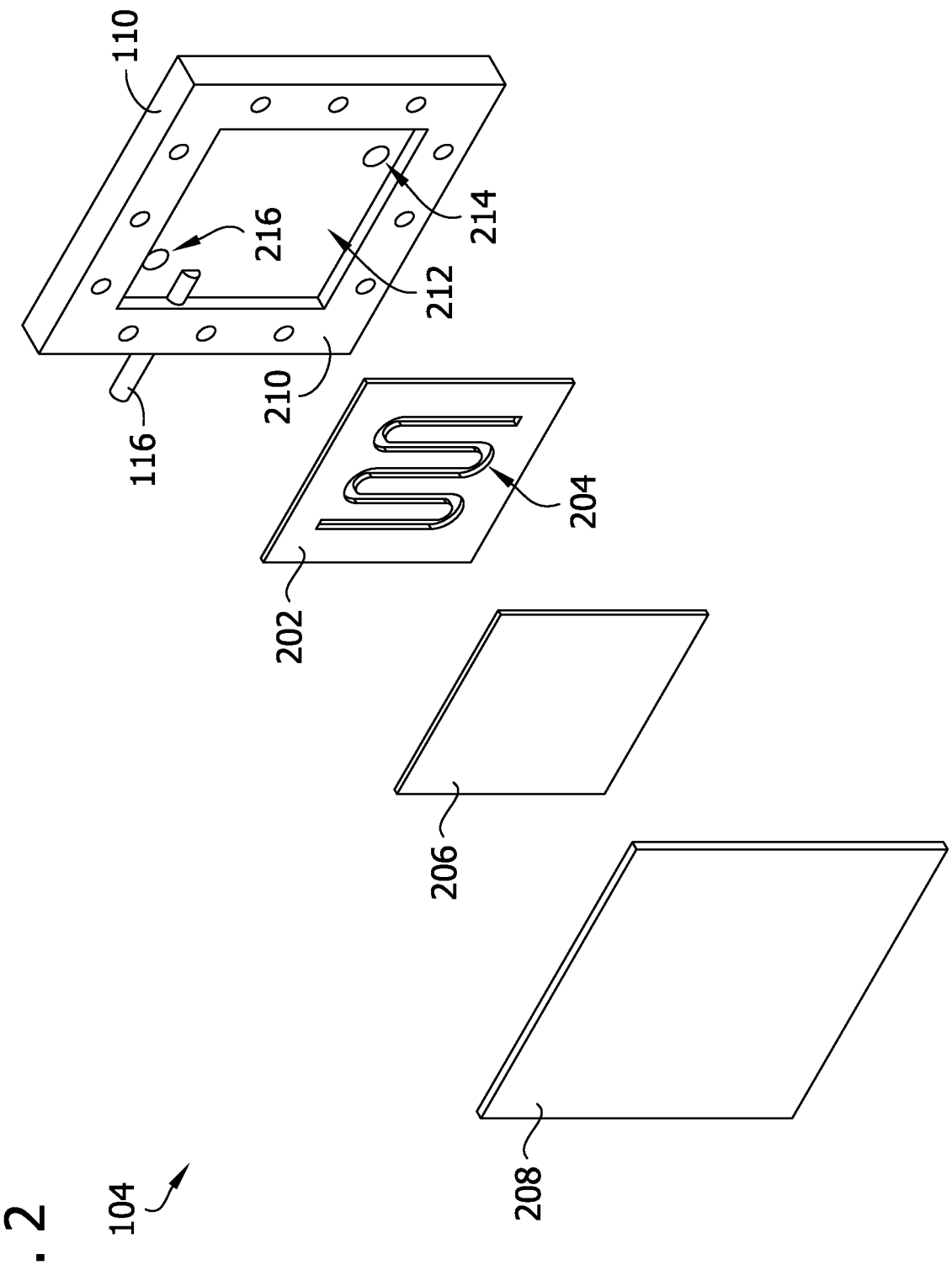
FIG. 2 is an exploded view illustrating individual internal elements of an exemplary reaction cell of the energy storage system of FIGS. 1A and 1B.

FIG. 2 illustrates an exploded view of aspects of reaction flow cell 104. In the illustrated embodiment, reaction flow cell 104 includes first housing 110, conductor 116, a current collector 202, a flow channel 204, an electrode 206, and a membrane 208. The first housing 110 includes an inner surface 210, a recess 212 in at least a portion of the inner surface 210, an inlet 214, and an outlet 216. Although described herein as being positioned within first housing 110, one of ordinary skill in the art will understand that a corresponding current collector 202, flow channel 204, and electrode 206 are positioned within second housing 112.

The current collector 202 is configured to carry electrical current from the electrode 206 to the conductor 116. In an embodiment, current collector 202 is comprised of graphite. The flow channel 204 is formed in current collector 202 and configured to convey electrolyte fluid so that it is in contact with electrode 206. In the embodiment illustrated in FIG. 2, flow channel 204 is distributed in a serpentine configuration in an area defined by the length and width of recess 212. In an embodiment, the serpentine configuration may also be referred to as looped and/or wound. The flow channel 204 may also be would like a coil. The electrode 206 is configured to fluidly communicate electrolyte fluid so that it is in contact with membrane 208.

The membrane 208 is configured to provide an interface between adjacent electrodes 206. In other words, membrane 208 provides an interface between the electrolytes (e.g., anolyte and catholyte) fluidly communicated by the electrodes 206. In an embodiment, membrane 208 is configured to prevent electron transfer and allow ion transfer between electrodes 206 to maintain charge equilibrium. For example, membrane 208 may be comprised of a polymer, such as Nafion 117, Nafion 115, Nafion 211, and the like. As further described herein, membrane 208 may bisect a housing assembly comprised of first housing 110 and second housing 112 and the components positioned within each of them.

Figure 3:
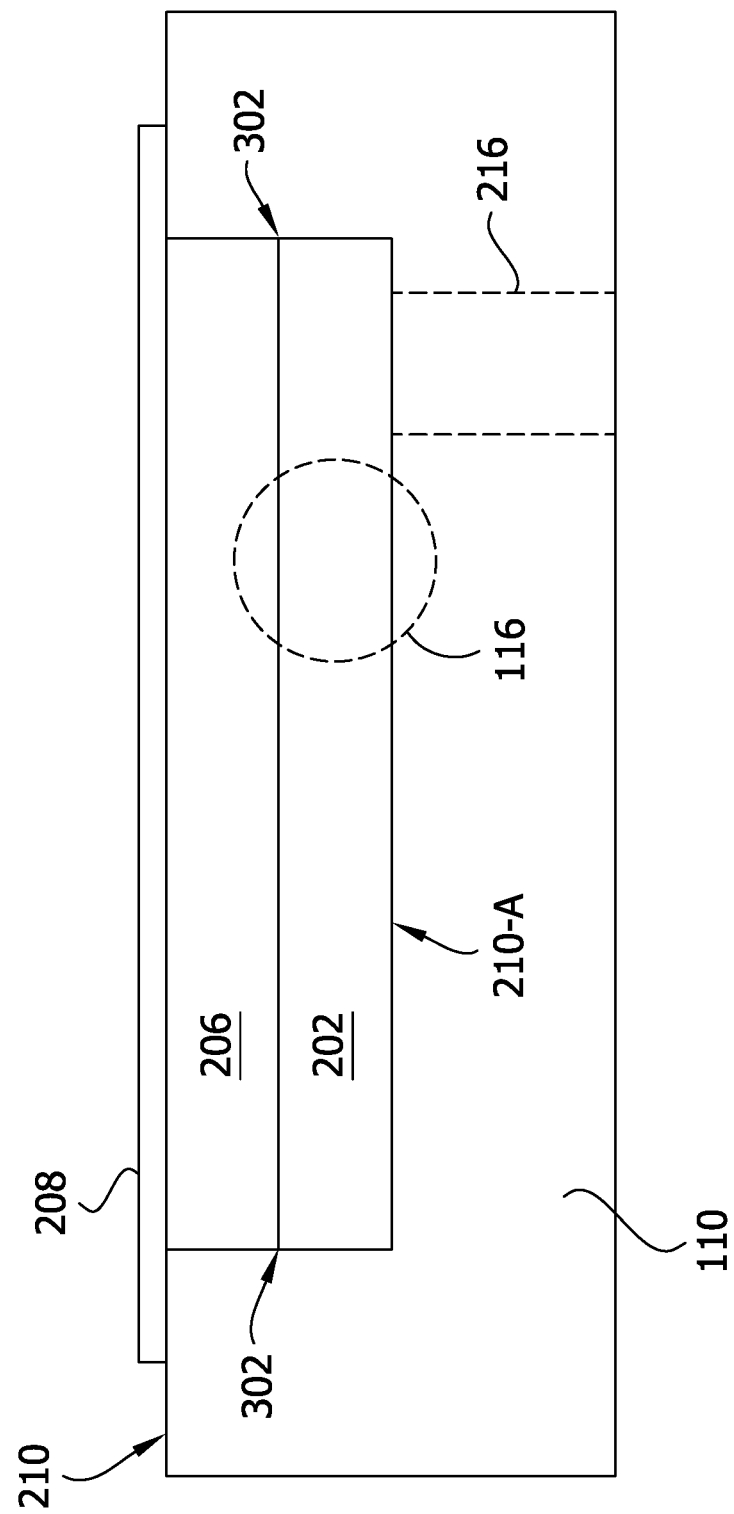
FIG. 3 is a cross-sectional view of the exemplary reaction cell of FIG. 2.

FIG. 3 illustrates a cross-section of reaction flow cell 104. As illustrated, a portion 210-A of the inner surface of first housing 110 is recessed, which forms recess 212 defined by recess walls 302. The recess walls 302 are configured to contain the electrolyte fluid conveyed by the flow channel. In this manner, the recess walls 302 obviate the need for gaskets. The current collector 202 and electrode 206 are positioned (e.g., embedded) within recess 212. In one or more embodiments, recess 212 may be referred to as a pocket.

Figure 4:
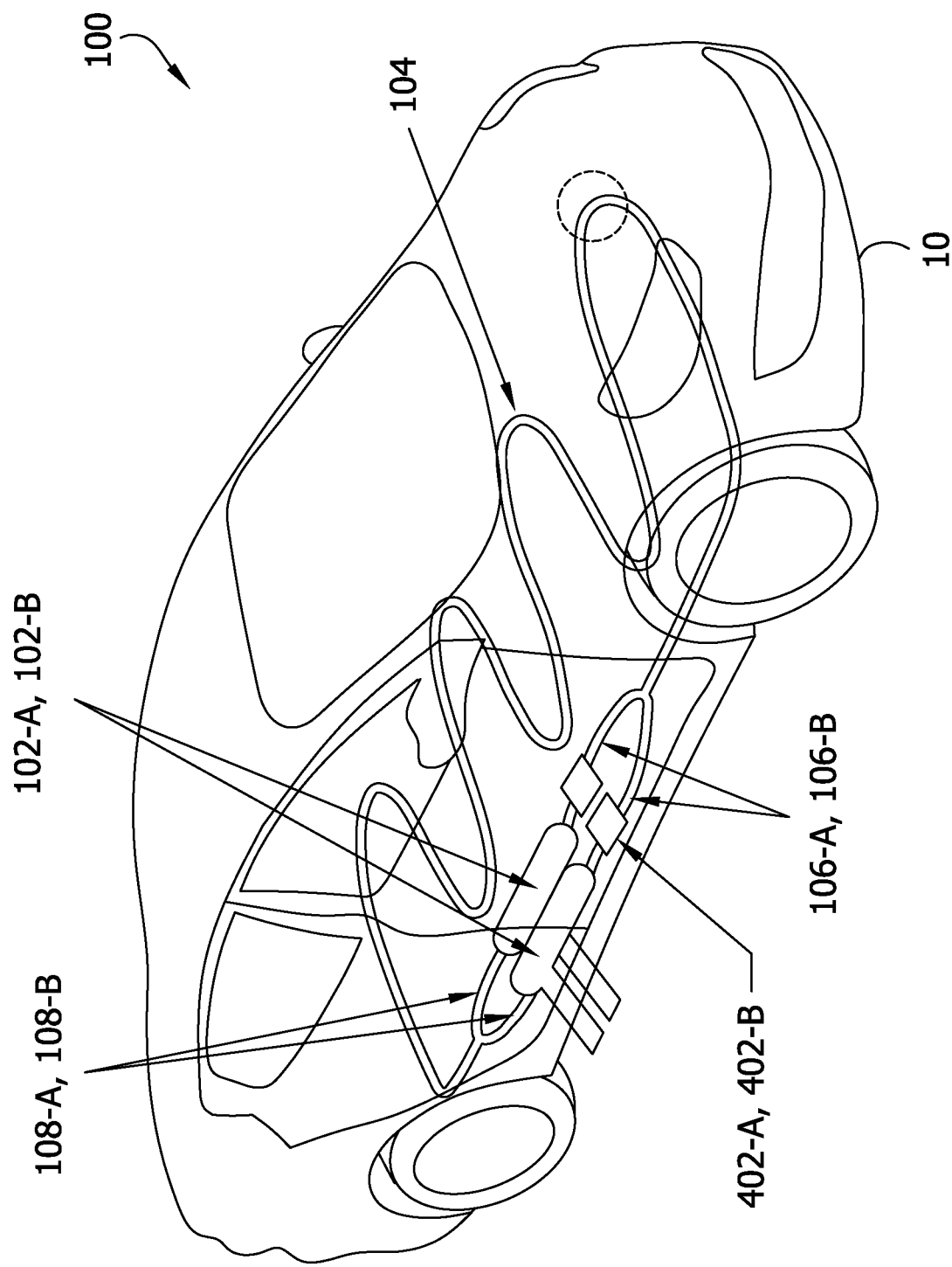
FIG. 4 illustrates an exemplary energy storage system and an exemplary transport system within which aspects of the invention may be incorporated.

FIG. 4 illustrates energy storage system 100 and an exemplary transport system 10 within which an embodiment of the energy storage system 100 may be incorporated. The energy storage system 100 includes tanks 102-A and 102-B, pumps 402-A and 402-B, input supply tubes 106-A and 106-B, reaction flow cell 104, and output supply tubes 108-A and 108-B. In an embodiment, energy storage system 100 comprises a vanadium redox battery (i.e., vanadium flow battery).

The input supply tube 106-A couples the tank 102-A to the pump 402-A and pump 402-A to reaction flow cell 104. The input supply tube 106-B couples the tank 102-B to the pump 402-B and pump 402-B to reaction flow cell 104. The output supply tubes 108-A, 108-B couple reaction flow cell 104 to tanks 102-A and 102-B, respectively. In an embodiment, tanks 102-A, 102-B, pumps 402-A, 402-B, input supply tubes 106-A, 106-B, reaction flow cell 104, and/or output supply tubes 108-A, 108-B are mechanically coupled to portions of transport system 10. For example, mechanical fasteners (e.g., brackets, braces, etc.) may couple the components of energy storage system 100 to structural elements (e.g., undercarriage, frame, etc.) of transport system 10.

Although the transport system 10 illustrated in FIG. 4 is an automobile, one having ordinary skill in the art will understand that aspects of energy storage system 100 may be incorporated within other types of transport systems. Additional transport systems within which energy storage system 100 may be incorporated include, but are not limited to, motor vehicles (e.g., automobiles, motorcycles, scooters, trucks, buses, etc.), railed vehicles (e.g., trains, trams, etc.), watercraft (e.g., ships, boats, etc.), aircraft (e.g., airplanes, unmanned aerial vehicles, etc.), spacecraft, self-propelled robots, and the like. The energy storage system 100 may be particularly useful in electric vehicles and other types of transport systems that require a clean power source.

The pumps 402-A, 402-B are each configured for pumping electrolytes (e.g., anolyte, catholyte, etc.) from tanks 102-A, 102-B through input supply tubes 106-A, 106-B, respectively, to reaction flow cell 104. Exemplary pumps include SMART Digital DDA 7.5-16AR-PVC/V/C model pumps manufactured by Grundfos, Bjerringbro, Germany.

As illustrated in FIG. 4, reaction flow cell 104 is distributed throughout transport system 10. For example, reaction flow cell 104 may be rolled into a tubular configuration and distributed in a serpentine configuration in an area defined by the length and width of transport system 10, as shown in FIG. 4. In an embodiment, the serpentine configuration may also be referred to as looped and/or wound. Although the serpentine configuration illustrated in FIG. 4 includes loops in a direction transverse to transport system 10, one having ordinary skill in the art will understand that the loops may be in other directions, such as longitudinally relative to transport system 10 and the like. The reaction flow cell 104 may also be wound like a coil and/or distributed throughout transport system 10 in three dimensions. The reaction flow cell 104 may also be in a plate-like configuration in accordance with one or more aspects of the disclosure. In an embodiment, distribution of reaction flow cell 104 throughout transport system 10 is configured to efficiently utilize available space in transport system 10, distribute the weight of reaction flow cell 104, and/or increase (e.g., maximize) the length of the membrane 208 relative to the volume of reaction flow cell 104 (e.g., to increase electrical power capacity). In another embodiment, reaction flow cell 104 is configured to permit charging of energy storage system 100. One having ordinary skill in the art will understand that the various configurations of reaction flow cell 104 described herein may be interchanged without departing from the scope of the present invention.

In an exemplary operation of energy storage system 100, pump 402-A pumps anolyte from tank 102-A through an electrode 206 configured as an anode electrode and pump 402-B pumps catholyte from tank 102-B through an electrode 206 configured as a cathode electrode. Optionally, pump 402-A also pumps anolyte through a flow channel 204 configured as an anode flow channels and/or pump 402-B also pumps catholyte through a flow channel 204 configured as a cathode channel. During discharge of energy storage system 100, electrons are released from the electrode 206 configured as an anode electrode (e.g., negative) and ions pass through membrane 208. For example, the electrons may be released via an oxidation reaction. The released electrons pass through a current collector 202 configured as an anode current collector and through an electrical load of transport system 10 such that the movement of electrons creates an electrical current. The electrode 206 configured as a cathode electrode (e.g., positive) accepts electrons, such as via a reduction reaction for example. As understood by one having ordinary skill in the art, the potential difference between the anode electrode and the cathode electrode determines the voltage (e.g., electromotive force) generated by energy storage system 100. And because the product of voltage and current is electric power (e.g., P=V*I), energy storage system 100 delivers electrical energy to the electrical load of transport system 10.

An electrochemical reaction cell in accordance with an aspect of the disclosure includes a housing (e.g., first housing 110), an electrode (e.g., electrode 206), and a current collector (e.g., current collector 202). The housing has an inner surface (e.g., inner surface 210) and a recess (e.g., recess 212) formed in the inner surface. The housing is configured to be assembled with a corresponding housing (e.g., second housing 112) of another electrochemical reaction cell. Moreover, the housing has an inlet (e.g., inlet 214) and an outlet (e.g., outlet 216) extending from the recessed inner surface (210-A) to an outer surface of the housing. The inlet is configured to permit an electrolyte fluid (e.g., anolyte, catholyte, etc.) to flow into the recess and the outlet is configured to permit the electrolyte fluid to flow out of the recess. The electrode is positioned within the recess and the current collector is positioned within the recess between the electrode and the recessed inner surface of the housing. The current collector has a flow channel (e.g., flow channel 204) formed in it that is configured to convey the electrolyte fluid such that the electrolyte fluid is in contact with the electrode. The housing is substantially rigid such that the housing provides an assemble force when the housing is assembled with the corresponding housing of the other electrochemical reaction cell.

In one form, the housing includes recess walls (e.g., recess walls 302) that define an area of the recess. In another form, the recess walls are configured to contain the electrolyte fluid conveyed by the flow channel. Containing the electrolyte in this manner reduces the likelihood of leakages of the electrolyte fluid from the electrochemical reaction cell, for example. In yet another form, the current collector comprises a sheet that has an area approximately equal to the area of the recess. Moreover, an area of the electrode is approximately equal to the area of the recess. In this manner, the current collector and the electrode fit within the recess and a contact area between the current collector and the electrode is approximately equal to the area of the recess (e.g., is maximized). In another form, the electrochemical reaction cell further comprises a membrane (e.g., membrane 208) that has an area greater than the area of the recess. The membrane is configured to form an interface between the electrode an electrode of the other electrochemical reaction cell.

In yet another form, the electrochemical reaction cell further comprises a conductor (e.g., conductor 116) that is in electrical communication with the current collector and extends through to the outer surface of the housing. In another form, the flow channel is distributed throughout the current collector in a serpentine configuration. In yet another form, the housing is comprised of a dielectric material that is non-porous and non-brittle. In another form, the dielectric material comprising the housing has a low permeability for the electrolyte fluid. In yet another form, the dielectric material comprising the housing is a thermoplastic. In another form, the thermoplastic is polyvinyl chloride (PVC). In yet another form, the electrolyte fluid is an anolyte and the electrode is an anode electrode. In another form, the electrolyte fluid is a catholyte and the electrode is a cathode electrode.

An energy storage system (e.g., energy storage system 100) in accordance with another aspect of the disclosure includes a first tank (e.g., tank 102-A), a second tank (e.g., tank 102-B), a reaction cell (e.g., reaction flow cell 104), a first pump (e.g., pump 402-A), and a second pump (e.g., pump 402-B). The first tank is configured for storing an anolyte and the second tank is configured for storing a catholyte. The reaction cell includes a first housing portion (e.g., first housing 110), a first current collector (e.g., current collector 202), an anode electrode (e.g., electrode 206), a second housing portion (e.g., second housing 112), a second current collector (e.g., current collector 202), a cathode electrode (e.g., electrode 206), and a membrane (e.g., membrane 208). The first housing portion has an inner surface (e.g., inner surface 210) and a first recess (e.g., recess 212) formed in the inner surface. The first current collector is positioned within the first recess adjacent to the recessed inner surface (210-A) of the first housing portion. The first current collector has an anolyte flow channel (e.g., flow channel 204) formed in it that is in fluid communication with the first tank. The anolyte flow channel is configured to convey the anolyte. The anode electrode is also positioned within the first recess adjacent to the first current collector. The second housing portion has an inner surface (e.g., inner surface 210) and a second recess (e.g., recess 212) formed in the inner surface. The second current collector is positioned within the second recess adjacent to the recessed inner surface (210-A) of the second housing portion. The second current collector has a catholyte flow channel (e.g., flow channel 204) formed in it that is in fluid communication with the second tank. The catholyte flow channel is configured to convey the catholyte. The cathode electrode is also positioned within the second recess adjacent to the second current collector. The membrane is positioned adjacent to the non-recessed portions of the inner surfaces of the first and second housing portions such that it is configured to form an interface between the anode electrode and the cathode electrode. The first pump is configured for pumping the anolyte from the first tank through the anolyte flow channel via a first input supply tube (e.g., input supply tube 106-A) and the second pump is configured for pumping the catholyte from the second tank through the catholyte flow channel via a second input supply tube (e.g., input supply tube 106-B). The first and second housing portions are assembled together at the non-recessed inner surfaces with the membrane between them such that the anolyte is confined within the first recess and the catholyte is confined within the second recess.

In one form, the first current collector is a sheet (e.g., graphite sheet) having an area approximately equal to an area of the first recess and the anode electrode has an area approximately equal to the area of the first recess. In this manner, the first current collector and the anode electrode fit within the first recess and a first contact area between the first current collector and the anode electrode is approximately equal to the area of the first recess (e.g., is maximized). In this form, the second current collector is a sheet (e.g., graphite sheet) having an area approximately equal to an area of the second recess and cathode electrode has an area approximately equal to the area of the second recess. Accordingly, the second current collector and the cathode electrode fit within the second recess and a second contact area between the second current collector and the cathode electrode is approximately equal to the area of the second recess (e.g., is maximized).

In another form, the energy storage system further comprises an anode conductor (e.g., conductor 116) and a cathode conductor (e.g., conductor 118). The anode conductor is in electrical communication with the first current collector and extends through to an exterior of the first housing portion. Similarly, the cathode conductor is in electrical communication with the second current collector and extends through to an exterior of the second housing portion. In yet another form, the anode conductor and cathode conductor are configured for providing electrical current generated in the reaction cell to an electrical load of a transport system (e.g., transport system 10). In another form, the first housing portion and the second housing portion are each comprised of a substantially rigid thermoplastic material that is a dielectric and has a low permeability for the anolyte and the catholyte.

In accordance with another aspect of the present disclosure, a transport system (e.g., transport system 10) includes a first tank (e.g., tank 102-A), a second tank (e.g., tank 102-B), a reaction cell (e.g., reaction flow cell 104), a first pump (e.g., pump 402-A), and a second pump (e.g., pump 402-B). The first tank is configured for storing an anolyte and the second tank is configured for storing a catholyte. The reaction cell includes a first housing portion (e.g., first housing 110), an anode current collector (e.g., current collector 202), an anode electrode (e.g., electrode 206), a second housing portion (e.g., second housing 112), a cathode current collector (e.g., current collector 202), a cathode electrode (e.g., electrode 206), and a membrane (e.g., membrane 208). The first housing portion has an inner surface (e.g., inner surface 210) and a first recess (e.g., recess 212) formed in the inner surface. The anode electrode is positioned within the first recess and the anode current collector is positioned within the first recess between the anode electrode and the first recessed inner surface (210-A) of the first housing portion. The anode current collector has an anolyte flow channel (e.g., flow channel 204) formed in it that is in fluid communication with the first tank. The anolyte flow channel is configured to convey the anolyte. The second housing portion has an inner surface (e.g., inner surface 210) and a second recess (e.g., recess 212) formed in the inner surface. The cathode electrode is positioned within the second recess and the cathode current collector is positioned within the second recess between the cathode electrode and the second recessed inner surface (210-A) of the second housing portion. The cathode current collector has a catholyte flow channel (e.g., flow channel 204) formed in it that is in fluid communication with the second tank. The catholyte flow channel is configured to convey the catholyte. The membrane is configured to form an interface between the anode electrode and the cathode electrode. The first pump is configured for pumping the anolyte from the first tank through the anolyte flow channel via a first input supply tube (e.g., input supply tube 106-A) that couples the first tank and the reaction cell. Similarly, the second pump is configured for pumping the catholyte from the second tank through the catholyte flow channel via a second input supply tube (e.g., input supply tube 106-B). The first and second housing portions are assembled together with the membrane between them such that the anolyte is confined within the first recess and the catholyte is confined within the second recess. The reaction cell is tubular and distributed throughout the transport system in a serpentine configuration within an area defined by the width and length of the transport system.

EXAMPLE

Two lab-scale VRFBs with single-cell configuration were manufactured. The first VRFB was a traditional design cell, referred to as (TD) herein, utilized by conventional VRFBs. A graphite plate was used to engrave the flow field channels. The cell was assembled from the following components: proton exchange membrane with a 50×50 mm2 area (Nafion 117, and 0.183 mm thickness); two symmetric electrodes of graphite felt with a 50×50 mm2 area as cathode and anode with a 6 mm total thickness and specific resistance of 0.12 Ohm·cm; electrolyte distributors (e.g., flow field channels) to divide the electrolyte uniformly across the active area of the VRFB, which had a serpentine pattern on a black graphite plate that could serve as a current collector as well. Gaskets and electric insulators made of polytetrafluoroethylene (PTFE) were utilized to avoid electrolyte leakage among the assembled components and to prevent electric current from going away from the flow field plate to the end plates; two Garolite sheets with 120×120 mm2 outer dimensions offering mechanical strength and good electrical insulating qualities were used as end plates with a total of 12 bolts, uniformly distributed along the endplate boundary to compact the cell components and avoid leaking and, finally, a high-density polyethylene (HDPE) material, for tubing, compression fittings (⅛ NPT×¼ inches OD tube), and a tank, was used to feed the electrolyte solution into the cell stack from external tanks, and vice versa, by two pumps.

The second cell refers to the new design (ND) described herein (e.g., reaction flow cell 104) in which a thermoplastic material, (e.g., PVC), 12.7 mm thick and 120 mm side long, was used to replace the graphite plate. As further described herein, the architecture was based on an embedded structure, so all components were inside the recess. Consequently, many components, such as gaskets, insulators, and end plates were not necessary. Use of gaskets was avoided by making a square recess at a specific depth, (e.g., 5 mm), and since the PVC is a good dielectric material, insulating material was not needed. Also, PVC is hard enough to provide an assemble force, so no end plates were needed. This new design made assembly easy, and produced a lightweight, mechanically robust, and cost-effective product. Based on the same exterior dimensions as the assembled cells (120×120 mm2), the utilized electrode area and membrane in the ND were larger than in the TD (80×80 mm2 vs. 50×50 mm2), respectively.

The flow field plates of each design included flow channels with a 4×2 mm2 cross section area and a land width of 7.5 mm among the channels. Also, one graphite rod material that was ¼ inch thick and 2.5 inches long (side) was fixed through each PVC compartment in the new design to serve as a current conductor. The depth of the recess was made less than the original thickness of the electrode (6 mm) to accomplish an approximate 16.5% compression ratio. Since increasing the compression ratio resulted in a high-pressure drop (high pumping power), due to a reduction in felt permeability, the graphite felt electrode compression ratio was limited to 1 mm.

For both designs, the electrolyte solution was prepared by dissolving 1.04 M VOSO4.xH2O (99.9% wt. purity) in 4 M sulphuric acid solution to get the electrolyte V4+. Each tank had 100 ml of anolyte and catholyte, which was pumped into the cell electrodes from the tanks, and vice versa, by two pumps. A constant laboratory temperature (around 24° C.) was maintained during all tests. The battery was regarded as fully charged, after being constantly charged at 1.75 V, until the current density dropped to 40 mA/cm2. In the first charge (where 100 ml of V4+ electrolyte solution were placed in an anode side tank and 200 ml were placed in a cathode side tank), the V4+ was transformed into V5+ and V2+ in both solutions (catholyte and anolyte), respectively. Then, half of the catholyte amount was removed after new colors were observed in both sides (i.e., violet in the anode side and yellow in the cathode side).

All experimental measurements, including cycling plots, polarization curves, and impedance analysis data were conducted using a 4 Channel Battery Analyzer, BST8-20A-CST with a range of flow rates and applied currents. During the test time, leaking issues (which can impact cell performance) were not observed, except for the presence of some electrolyte leakage from the graphite plates in the TD cell design due to their permeability. Results from these experiments are discussed below.

Permeability of the PVC and Graphite Bipolar Plates: The PVC of the ND cell successfully prevented electrolyte penetration.

Charge/Discharge Behavior: The total run time for achieving four charge and discharge cycles of the ND cell was longer than the time required for the TD cell. Moreover, the ND cell exhibited a slower rate of capacity loss than the TD cell.

Performance Efficiency: Performance efficiencies were measured under a 500 mA applied charge/discharge current with a 35 mL/min electrolyte flow rate. On average, the ND cell exhibited a columbic efficiency (CE) of ca. 90.57% and an energy efficiency (EE) of ca. 79.03% during four charge/discharge cycles, while the TD cell exhibited a CE of ca. 84.53% and an EE of ca. 74.84%.

Impact of Current: For the ND cell, when the applied current increased, the CE increased due to a high rate of electrolyte consumption which, in turn, minimized the electrolyte cross-over through the membrane. The increased current values also resulted in a voltage efficiency (VE) decrease and an EE decrease.

Polarization Behavior: A polarization test was conducted at a fixed 25 ml/min flow rate. The measurements of discharge polarization curves were made at a fully charged battery condition, where a steady current of 40 mA, at cell potential of 1.7 V, was maintained. For both designs, the cells were discharged under a range of current values (up to 6 A) until a 0.1 V lower limit voltage was reached. The generated mass transport limiting currents from the TD and ND cells were 3250 and 6000 mA, respectively. This difference in the maximum limiting current can be attributed to the difference in the electrochemical surface area in both cells. The ND cell, which was based on the same outer dimensions as the TD cell, had more exposed surface area (80×80 mm) as compared to the TD cell (50×50 mm), which resulted in a more local current. At a given current across the battery, the high surface area in the ND cell reduced the local current on the surface of the electrode. The lower current density at the electrode surface led to lowered activation over potential loss. The output power had a tendency, similar to that of the cell voltage, where the maximum power was obtained as about 2561 mW in the TD cell and about 2750 mW in the ND cell (the peak power increased by 7.38%). Also, a wider range of power was observed in the ND cell than in the TD cell due to the higher current produced.

For the ND cell, the effects of electrolyte transport on polarization were further investigated by varying the electrolyte flow rate. The flow rate was controlled by setting the dosing pumps at a range of 1 to 45 ml/min. At low flow rates, the diffusion rate limited process, as compared to the rate of surface reaction. Consequently, increasing the supply of reaction species to the electrode surface enhanced power performance at a low current but, at a high current, it did not help significantly because the mass transfer at sufficiently high flow rates was no longer limited. Rather, the battery response was limited by the surface reaction rate. It was noticed that the limiting current could be increased (from 425 to 650 mA) at an analog range of flow rates (from 1 to 45 ml/min).

Contact Resistance Improvement: In order to improve the contact between the electrode and current collector and, to correspondingly reduce internal ohmic resistance (IOR), a patterned thin graphite sheet was fabricated using a water jet technique to shape the flow field channels, in a clean way, and with highly accurate channel dimensions. A pure compressible 1/16-inch thick graphite sheet was used. This patterned sheet served simultaneously as a flow field channel and current collector. The size of the electrode area in the ND cell was 255×28 mm2. It was observed that higher current density could be obtained from the ND cell due to the larger contact area between the current collector and electrode that resulted in lower contact resistance. For instance, the maximum current density of the ND cell at 1 and 45 ml/min volumetric flow rates was 73.53 and 115.55 mW/cm2. The improvements in the maximum current density and output power density can be attributed to the new configuration of the current collector, which ensured more contact area between the current collector and electrode surface, thereby reducing the internal resistance of the cell. A lower ohmic resistance of $0.18\Omega$ was also observed in the ND cell.

Economic Perspectives Analysis: Based on the same exterior dimensions of the TD and ND designs (i.e., 120× 120 mm), a cost comparison was made. The ND cell (e.g., based on PVC material) shared the same initial cost as some of the components in the TD cell (based on graphite plate material). These included the amount of electrolyte solution, external tubing, membrane, bolts, electrodes, pumps, and labor. However, other components had different costs resulting in a cost of $163.40 for the TD cell and a cost of $27.39 for the ND cell. In other words, the ND cell cost represents ~17% of that of the TD cell for the non-similar components, and ~65% when considering all components. Moreover, the gross weight of the ND cell was 0.78 kg (without any leaking issues), while the TD cell weighed 1.1 kg (and had significant leaking issues). As a result, the ND cell assembly is more cost-effective, requires fewer components, and is not as heavy as the traditional setup.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An electrochemical reaction cell, comprising:
    a substantially rigid first housing having a plurality of recess side walls and a recessed inner surface bounded by the recess side walls defining a recess formed in the first housing, the side walls substantially perpendicular to the recessed inner surface and having a top surface substantially parallel to the recessed inner surface, the first housing having an inlet and an outlet extending through the first housing from the recessed inner surface to an outer surface of the housing, the inlet configured to permit an electrolyte fluid to flow into the recess, and the outlet configured to permit the electrolyte fluid to flow out of the recess;
    an electrode positioned entirely within the recess;
    a current collector positioned entirely within the recess between the electrode and the recessed inner surface of the first housing, the current collector in direct contact with the electrode over a contact area when the current collector and the electrode are positioned within the recess, the current collector having at least one flow channel formed therein, the flow channel configured to convey the electrolyte fluid such that the electrolyte fluid is in direct contact with the electrode when the electrolyte fluid is in the flow channel; and
    a substantially rigid second housing corresponding to the first housing, the first and second housings configured to be assembled together into a single housing assembly, wherein the top surface of the recess side walls is in direct contact with the second housing when the first and second housings are assembled together.

2. The electrochemical reaction cell of claim 1, wherein the recess side walls are configured to contain the electrolyte fluid conveyed by the flow channel.

3. The electrochemical reaction cell of claim 1, wherein the recess has a surface area defined by the recess side walls and wherein the current collector comprises a sheet having a surface area approximately equal to the surface area of the recess.

4. The electrochemical reaction cell of claim 1, further comprising a membrane associated with the electrode.

5. The electrochemical reaction cell of claim 4, wherein the recess has a surface area defined by the recess side walls and wherein the membrane has a surface area greater than the surface area of the recess.

6. The electrochemical reaction cell of claim 1, further comprising a conductor in electrical communication with the current collector and extending through to the outer surface of the first housing.

7. The electrochemical reaction cell of claim 1, wherein the flow channel is distributed throughout the current collector in a serpentine configuration.

8. The electrochemical reaction cell of claim 1, wherein the first and second housing are comprised of a dielectric material that is non-porous and non-brittle.

9. The electrochemical reaction cell of claim 8, wherein the dielectric material comprising the housings has a low permeability for the electrolyte fluid.

10. The electrochemical reaction cell of claim 8, wherein the dielectric material comprising the housings is a thermoplastic.

11. The electrochemical reaction cell of claim 10, wherein the thermoplastic is polyvinyl chloride (PVC).

12. The electrochemical reaction cell of claim 1, wherein the electrolyte fluid is an anolyte and the electrode is an anode electrode.

13. The electrochemical reaction cell of claim 1, wherein the electrolyte fluid is a catholyte and the electrode is a cathode electrode.

14. The electrochemical reaction cell of claim 1, wherein the electrode has a surface area that is approximately equal to the surface area of the recess such that the current collector and the electrode fit within the recess.

15. The electrochemical reaction cell of claim 14, wherein the contact area is approximately equal to the surface area of the recess.

* * * * *